US008589984B1

(12) United States Patent
Acharya et al.

(10) Patent No.: US 8,589,984 B1
(45) Date of Patent: Nov. 19, 2013

(54) IN-SHOW PRODUCT ADVERTISEMENT AND PURCHASE SYSTEM

(75) Inventors: Ravi Acharya, Philadelphia, PA (US); William F. Mann, III, Avondale, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 1354 days.

(21) Appl. No.: 11/276,289

(22) Filed: Feb. 22, 2006

(51) Int. Cl.
*G06F 3/00* (2006.01)
*G06F 13/00* (2006.01)
*H04N 5/445* (2011.01)

(52) U.S. Cl.
USPC .......... 725/60; 725/36; 725/40; 725/41; 725/42; 725/43

(58) Field of Classification Search
USPC .......... 725/60, 61, 36, 40–43, 110, 112, 113; 705/26
See application file for complete search history.

(56) References Cited

U.S. PATENT DOCUMENTS

| | | | | |
|---|---|---|---|---|
| 5,861,906 A * | 1/1999 | Dunn et al. | | 725/87 |
| 5,900,905 A | 5/1999 | Shoff et al. | | |
| 6,191,825 B1 * | 2/2001 | Sprogis et al. | | 348/584 |
| 6,240,555 B1 | 5/2001 | Shoff et al. | | |
| 6,571,390 B1 | 5/2003 | Dunn et al. | | |
| 6,587,835 B1 * | 7/2003 | Treyz et al. | | 705/14 |
| 6,651,251 B1 | 11/2003 | Shoff et al. | | |
| 6,698,020 B1 * | 2/2004 | Zigmond et al. | | 725/34 |
| 6,735,778 B2 * | 5/2004 | Khoo et al. | | 725/60 |
| 6,934,963 B1 * | 8/2005 | Reynolds et al. | | 725/39 |
| 7,155,402 B1 * | 12/2006 | Dvorak | | 705/10 |
| 7,266,835 B2 * | 9/2007 | Halbert | | 725/60 |
| 7,313,802 B1 * | 12/2007 | Tomsen | | 725/23 |
| 7,337,457 B2 * | 2/2008 | Pack et al. | | 725/40 |
| 7,493,636 B2 * | 2/2009 | Kitsukawa et al. | | 725/23 |
| 7,813,954 B1 * | 10/2010 | Price et al. | | 705/14.1 |
| 8,132,202 B2 * | 3/2012 | Swix et al. | | 725/34 |
| 2002/0072993 A1 * | 6/2002 | Sandus et al. | | 705/26 |
| 2002/0194604 A1 * | 12/2002 | Sanchez et al. | | 725/60 |
| 2003/0046173 A1 * | 3/2003 | Benjier et al. | | 705/26 |
| 2003/0101454 A1 * | 5/2003 | Ozer et al. | | 725/42 |
| 2003/0131357 A1 * | 7/2003 | Kim | | 725/60 |
| 2003/0208758 A1 | 11/2003 | Schein | | |
| 2005/0076376 A1 * | 4/2005 | Lind | | 725/87 |
| 2006/0047835 A1 * | 3/2006 | Greaux | | 709/229 |
| 2007/0136130 A1 * | 6/2007 | Liu et al. | | 705/14 |
| 2007/0156521 A1 * | 7/2007 | Yates | | 705/14 |
| 2007/0186252 A1 * | 8/2007 | Maggio | | 725/86 |
| 2008/0102947 A1 * | 5/2008 | Hays et al. | | 463/31 |
| 2008/0184315 A1 * | 7/2008 | Ellis et al. | | 725/60 |
| 2009/0018919 A1 * | 1/2009 | Walker et al. | | 705/14 |
| 2009/0150937 A1 * | 6/2009 | Ellis et al. | | 725/46 |
| 2010/0058397 A1 * | 3/2010 | Rogers | | 725/60 |
| 2011/0167452 A1 * | 7/2011 | Baumgartner et al. | | 725/44 |

* cited by examiner

*Primary Examiner* — Brian Pendleton
*Assistant Examiner* — Nnenna Ekpo
(74) *Attorney, Agent, or Firm* — Hunton & Williams LLP

(57) ABSTRACT

An in-show product advertisement and purchase system is disclosed. The system effectively promotes product advertisement as well as enables customers to conveniently purchase the desired products directly from a displaying medium during the advertisement. The system establishes a linkage between show content and advertised products such that customers have practical impression and experience about what the advertised products embody in real life. The system is a TV version of an online store. The system is an interactive and listable method for advertisement. The in-show products are updateable.

26 Claims, 11 Drawing Sheets

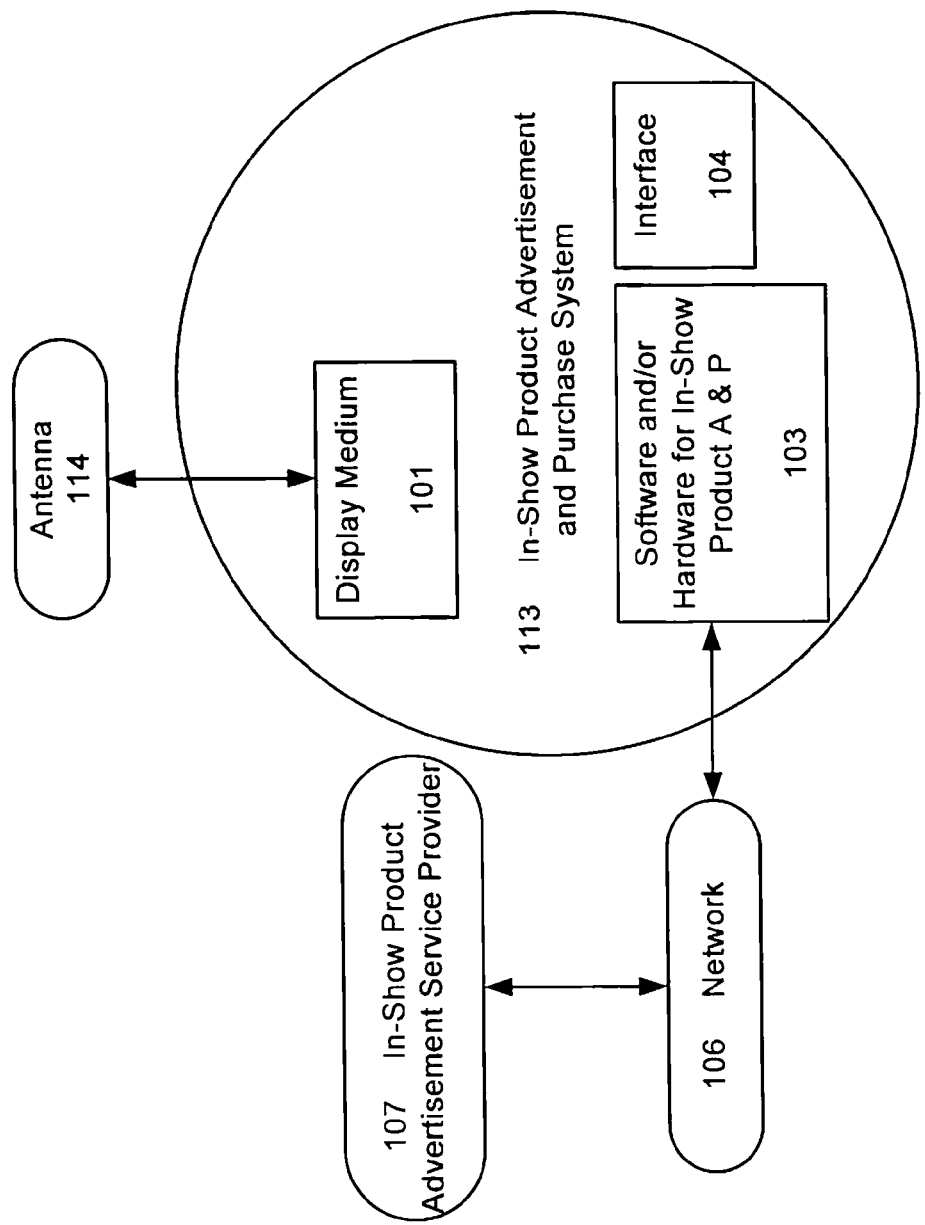

1. Tennis Racket
(2)

_Description_

Combined with Triad technology for maximum power, comfort and control.

NCODED Transmission locked within every NCODED racquet is the enhanced performance you always hoped to find in your current racquet. NCODE is.... potential realized.

Important Note Regarding Headsize:

According to the information printed on this tennis racquet the headsize is 113 in.$^2$, however; according to Wilson's website and all of their printed materials the headsize is 116 in.$^2$. The result of an independent measurement study conducted by the USRSA revealed that the actual headsize of this racquet is 115 in$^2$.

1. Return to Previous Page     2. Add to Shopping Cart     3. Exit

Figure 3D

IN-SHOW PRODUCT ADVERTISEMENT AND PURCHASE SYSTEM

FIELD OF THE INVENTION

The present invention relates to a method of in-show product advertisement and purchase so that a viewer can buy products of interest appearing with a show.

BACKGROUND OF THE INVENTION

There has been a significant increase in the number of consumers that use digital video recorders (DVRs) such as TiVo™. These devices allow consumers to record their favorite shows and in the meantime skip any commercials appearing within the shows.

However, this unexpectedly brings on a problem, i.e. the shrinking viewership of traditional advertisements, which is adverse for advertisers. In order to overcome this effect, the advertisers are resorting to various new ways to promote their products.

Among them, the in-show product placements method is catching much attention. Just one example of this was the "Austin Powers" movies where placements for beer were sold to the beer companies. But this method does not provide information to a viewer on where to buy products from. Furthermore, it does not provide the viewer a quick and easy way to buy the products.

Hence, there is a need to develop a system which enables the advertisers to effectively promote their products as well as enables the customers to conveniently and directly buy the desired products.

SUMMARY OF THE INVENTION

Therefore, the object of the present invention is to develop an in-show product advertisement and purchase system to effectively promote product advertisement as well as enable customers to conveniently purchase the desired products directly from a display medium during the advertisement.

In accordance with an aspect of the present invention, an in-show product advertisement and purchase system serves to establish a linkage between show content and advertised products such that customers have a practical impression and experience about the advertised products as being put to use during a show.

In accordance with another aspect of the present invention, an in-show product advertisement and purchase system serves a TV version of an online store.

In accordance with a further aspect of the present invention, an in-show product advertisement and purchase system serves a new interactive and listable method for advertisement.

In accordance with a yet another aspect of the present invention, an in-show product advertisement and purchase system serves to enable in-show products updateable.

In accordance with a still further aspect of the present invention, an in-show product advertisement and purchase system serves to avoid shrinking viewership of traditional advertisement.

The above and other objects and features of the present invention will be apparent in the following detailed description of the present invention when read in conjunction with the accompanying drawings.

BRIEF DESCRIPTION OF THE DRAWINGS

In order to facilitate a fuller understanding of the present invention, reference is now made to the accompanying drawings. These drawings should not be construed as limiting the present disclosure, but are intended to be exemplary only.

FIG. 1E-1F are block diagrams illustrating embodiments of an in-show product advertisement and purchase system with UHF/VHF TV as a program-receiving mode.

FIG. 3A-3D are diagrams illustrating an exemplary in-show product advertisement and purchase process in accordance with one embodiment of the present invention.

DETAILED DESCRIPTION OF THE INVENTION

Figure 1A:
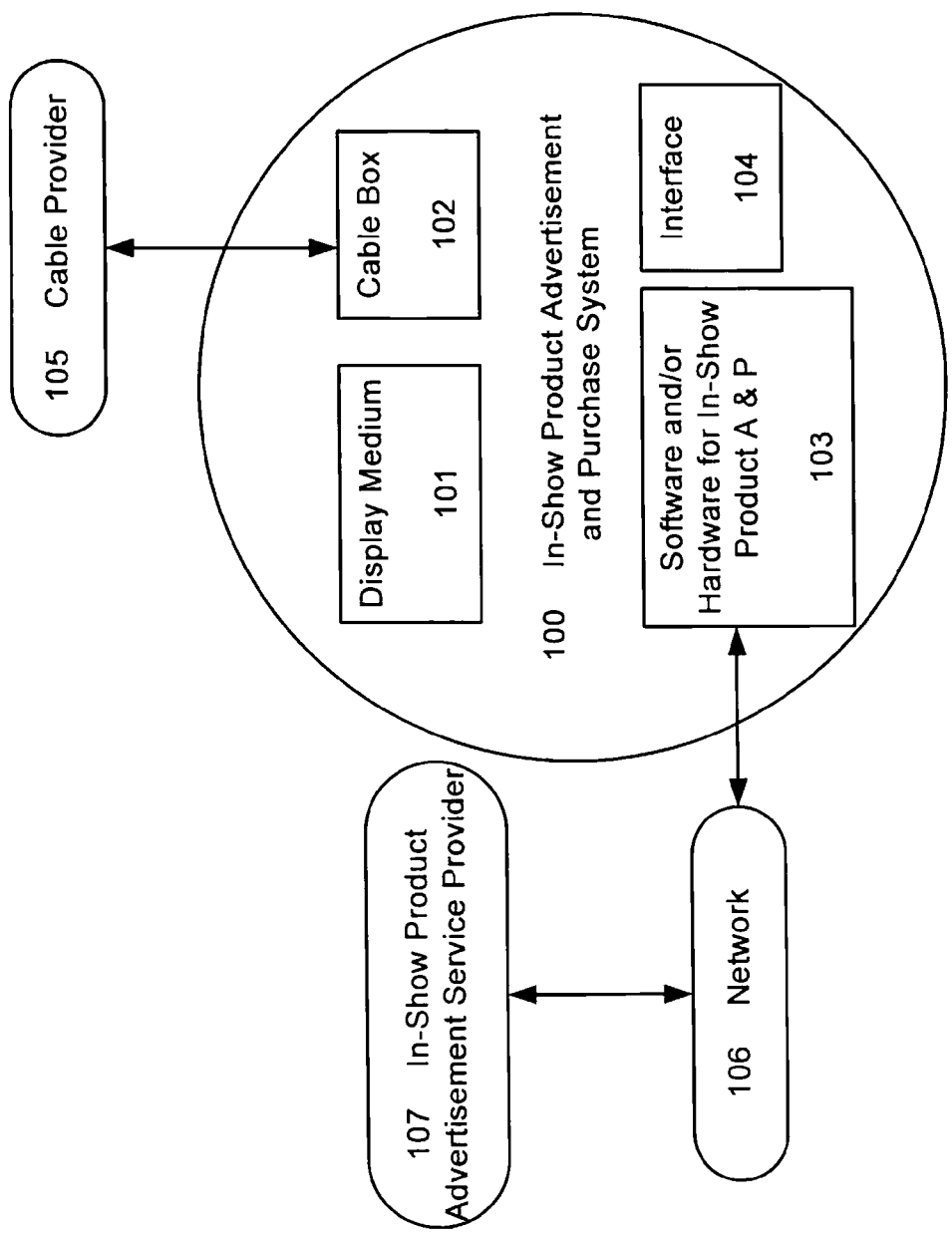
FIG. 1A-1B are block diagrams illustrating embodiments of an in-show product advertisement and purchase system with cable TV as a program-receiving mode.

FIG. 1A is a block diagram illustrating an embodiment of an in-show product advertisement and purchase system with cable TV as a program-receiving mode 100. The in-show product advertisement and purchase system comprises a display medium 101, a cable box 102, suitable software and/or hardware for in-show product advertisement and purchase 103, and an interface 104. The display medium could be any medium used for displaying video programs, preferably but not limited to a TV set. The cable box could be any system comprising suitable hardware and software, which is used to communicate with, and receive and convert cable programs from, a cable provider 105 using suitable linkage, and display them on the display medium. The suitable software and/or hardware for the in-show product advertisement and purchase could be any system used for communicating with and receiving from an in-show product advertisement service provider 107 using a network 106, and controlling and performing the function of the in-show product advertisement and purchase. In practice, the suitable software and/or hardware for the in-show product advertisement and purchase communicate with the in-show product advertisement service provider to get program information. In the meantime, the relevant advertisement information of in-show products is downloaded together with the program. The interface is a medium used for interacting between a viewer and the in-show product advertisement and purchase system, which could be but is not limited to a keyboard or a remote control device. According to another approach, the software and/or hardware for the in-show product advertisement and purchase, the cable box, and the interface, could be integrated with the cable box.

Figure 1B:
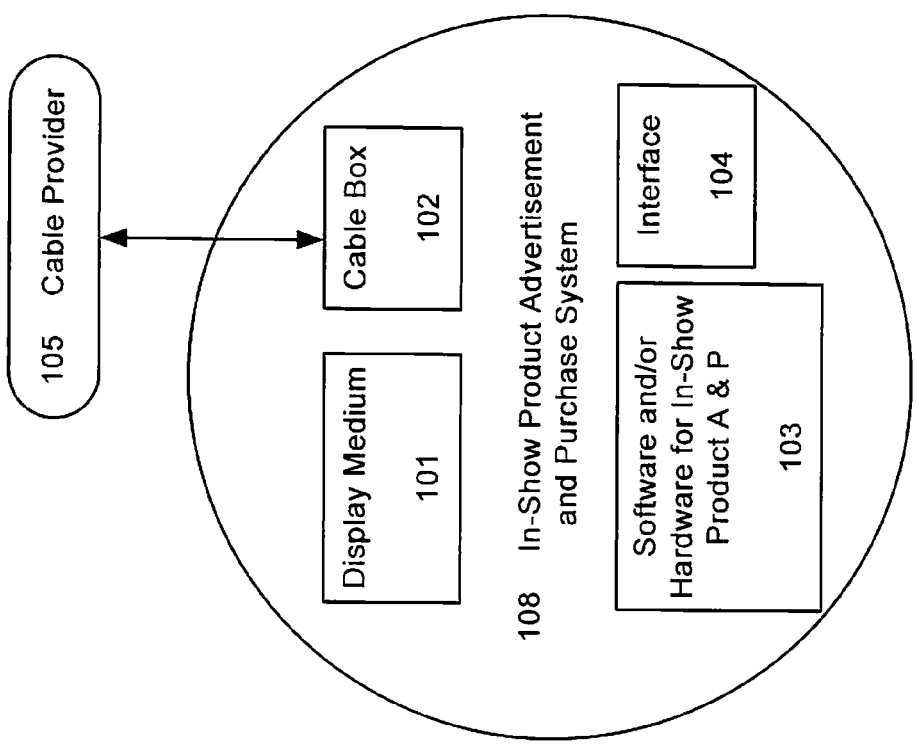

FIG. 1B is a block diagram illustrating another embodiment of an in-show product advertisement and purchase system with cable TV as a program-receiving mode 108. As a variation, the software and/or hardware for in-show product advertisement and purchase, the cable box, and the interface, could be integrated with the cable box. According to one embodiment, the suitable software and/or hardware for the in-show product advertisement and purchase communicate with the cable provider using the cable box to obtain advertisement information of in-show products along with programs, which could be combined with or separate from the programs. According to another embodiment, the advertisement information of in-show products could be obtained in real-time during a show. When a customer selects a product of interest, the cable box communicates with the show's advertisers and gets the desired information.

Figure 1C:
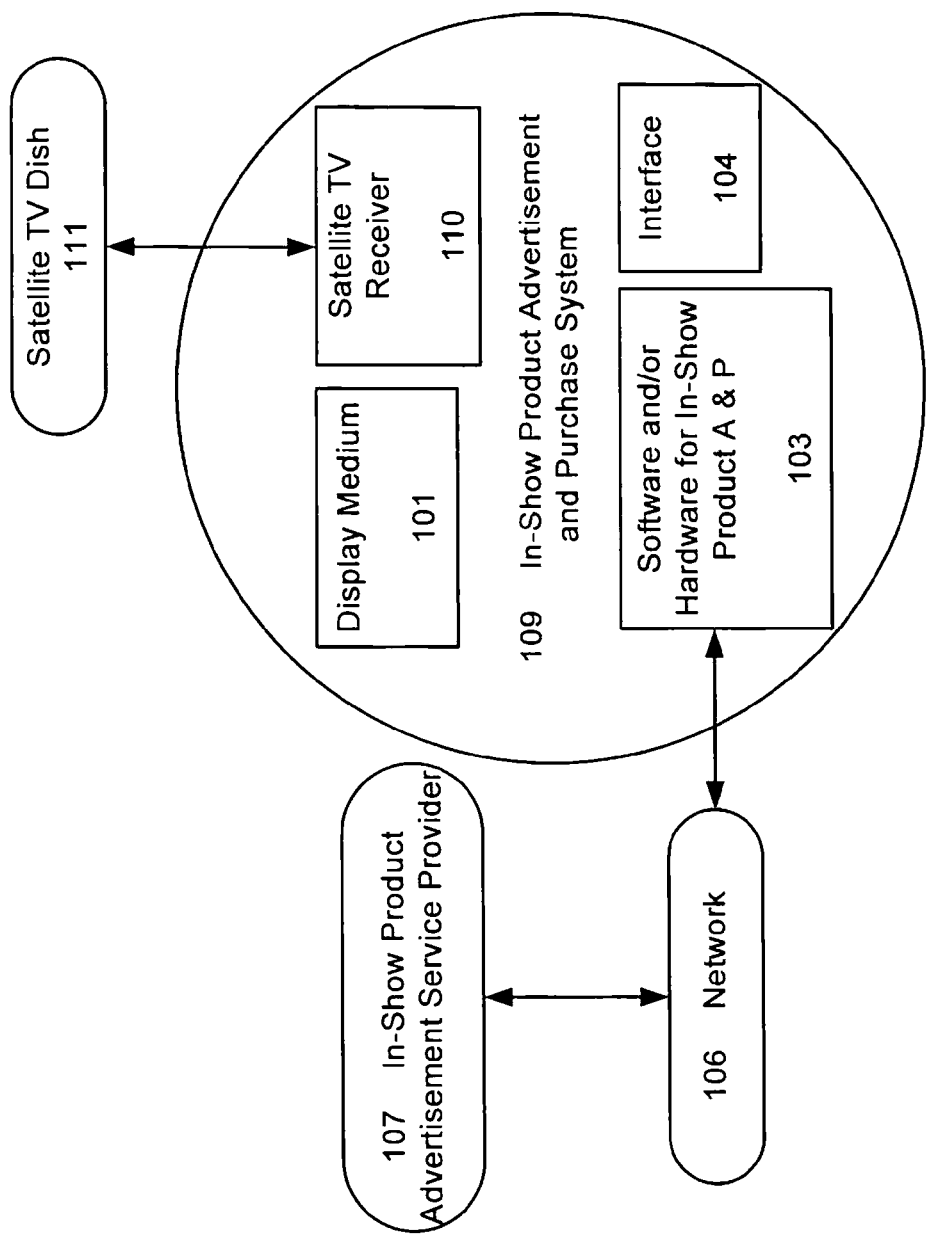
FIG. 1C-1D are block diagrams illustrating embodiments of an in-show product advertisement and purchase system with satellite TV as a program-receiving mode.

FIG. 1C is a block diagram illustrating an embodiment of an in-show product advertisement and purchase system with satellite TV as a program-receiving mode 109. This embodiment is a variation of the embodiment shown in FIG. 1A, in which the cable box 102 is substituted with a satellite TV receiver 110. The satellite TV receiver is connected with a satellite TV dish 111 to receive programs. According to another approach, the software and/or hardware for in-show product advertisement and purchase, the satellite TV receiver, and the interface, could be integrated with the satellite TV receiver.

Figure 1D:
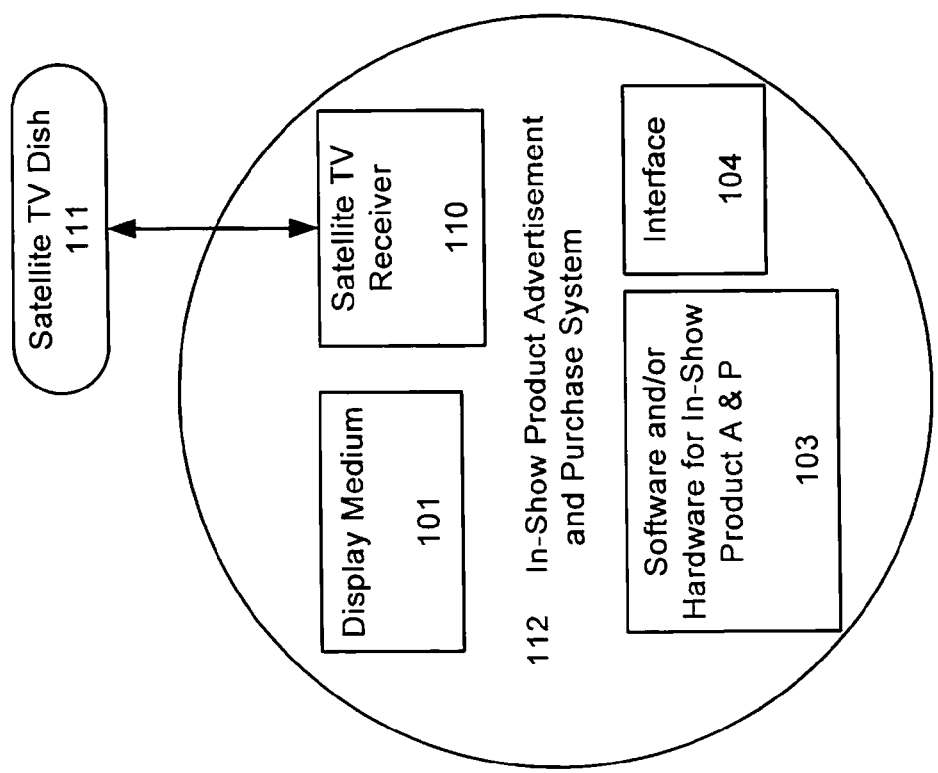

FIG. 1D is a block diagram illustrating another embodiment of an in-show product advertisement and purchase system with satellite TV as a program-receiving mode 112. This embodiment is a variation of the embodiment shown in FIG. 1B, in which the cable box 102 is substituted by a satellite TV receiver 110 and the satellite TV receiver is connected with the satellite TV antenna to receive programs. According to another approach, the software and/or hardware for in-show product advertisement and purchase, the satellite TV receiver, and the interface, could be integrated with the satellite TV receiver.

FIG. 1E is a block diagram illustrating an embodiment of an in-show product advertisement and purchase system with public-broadcasting (UHF/VHF) TV as a program-receiving mode 113. This embodiment is a variation of the embodiment shown in FIG. 1A, in which the TV set is connected with an antenna 114 and the cable box is not needed. According to another approach, the software and/or hardware for in-show product advertisement and purchase, and the interface, could be integrated.

Figure 1F:
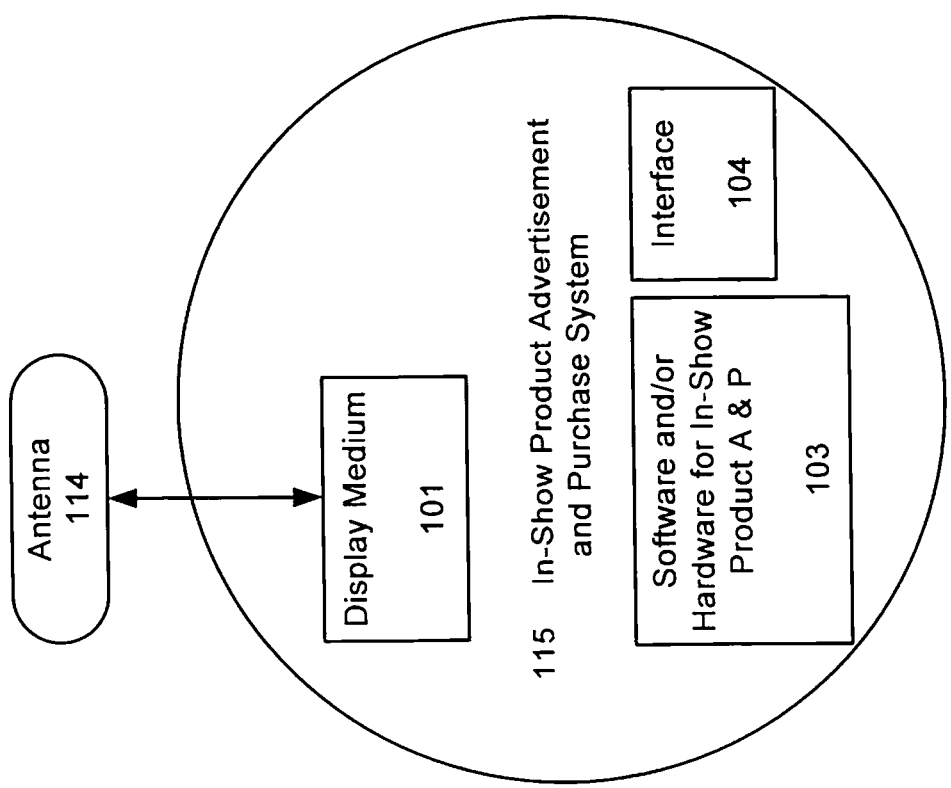

FIG. 1F is a block diagram illustrating another embodiment of an in-show product advertisement and purchase system with public-broadcasting TV (UHF/VHF) as a program-receiving mode 115. This embodiment is a variation of the embodiment shown in FIG. 1B, in which the TV set is connected with an antenna and the cable box is not needed. According to another approach, the software and/or hardware for in-show product advertisement and purchase, and the interface, could be integrated.

It should be understood that the specific hardware and software used in the in-show product advertisement and purchase system is not critical to the present invention, and one of ordinary skills in the art will readily appreciate variations in hardware and software configurations that are suitable.

Figure 2:
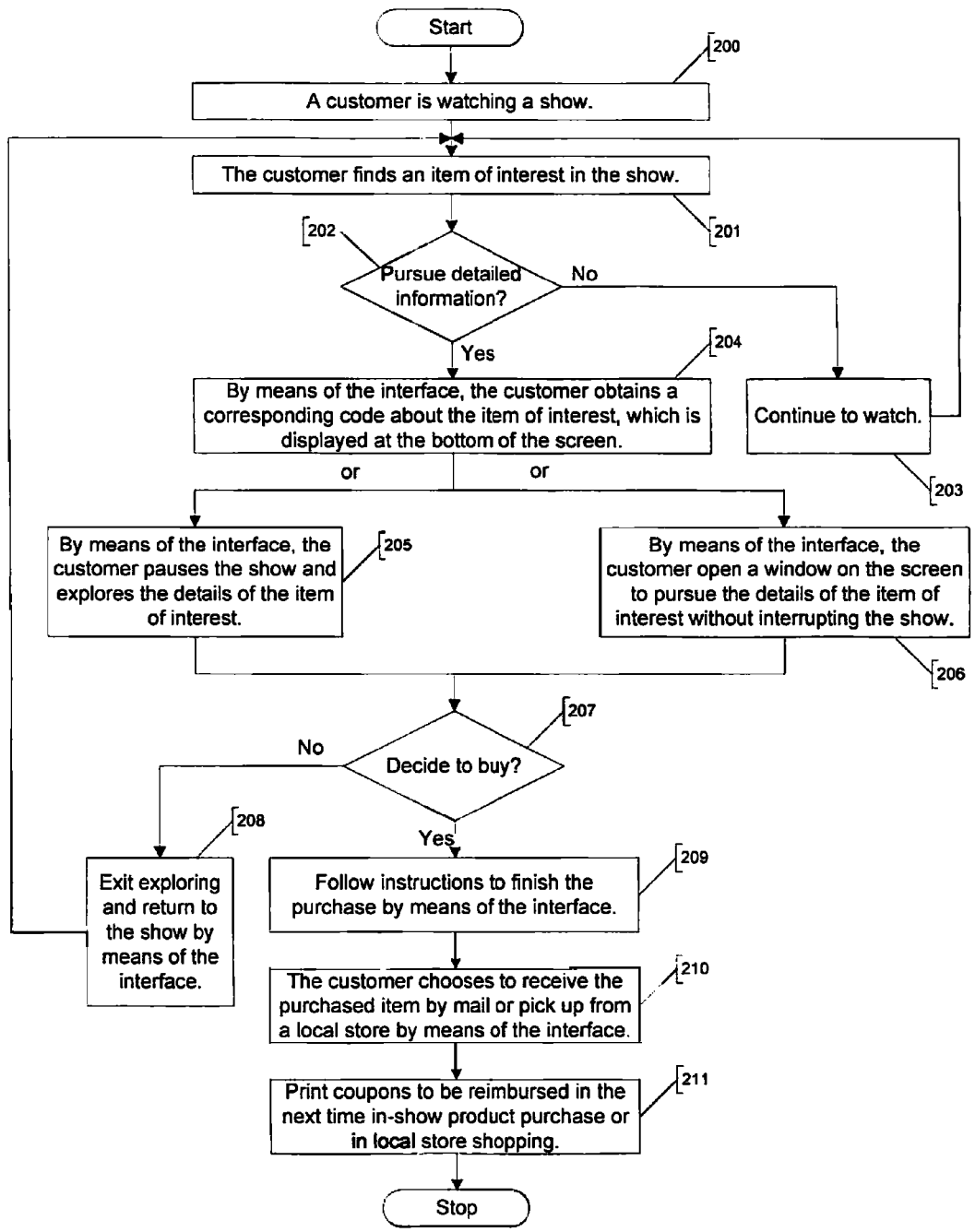
FIG. 2 is a flowchart showing an in-show product advertisement and purchase process in accordance with one embodiment of the present invention.

FIG. 2 is a flowchart showing an in-show product advertisement and purchase process in accordance with one embodiment of the present invention. FIG. 3A-3D are diagrams illustrating an exemplary in-show product advertisement and purchase process in accordance with one embodiment of the present invention. The method of FIG. 2 is described in connection with FIG. 3A-3D in order to set forth the method in a concrete fashion easily understood by the person of ordinary skills. However, this articulation of the method is exemplary only, and the method could be implemented differently from those of FIG. 3A-3D.

Figure 3A:
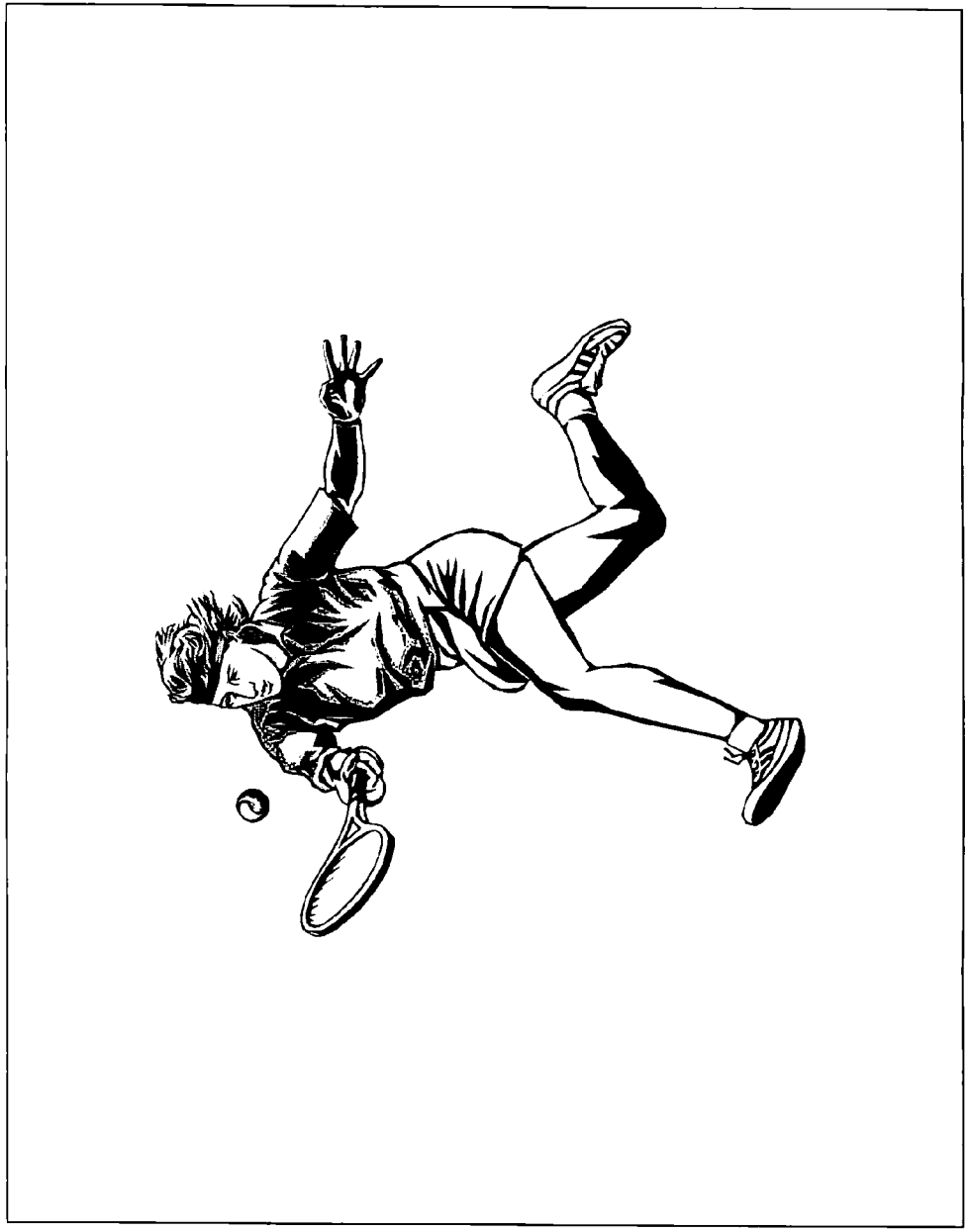
Figure 3B:
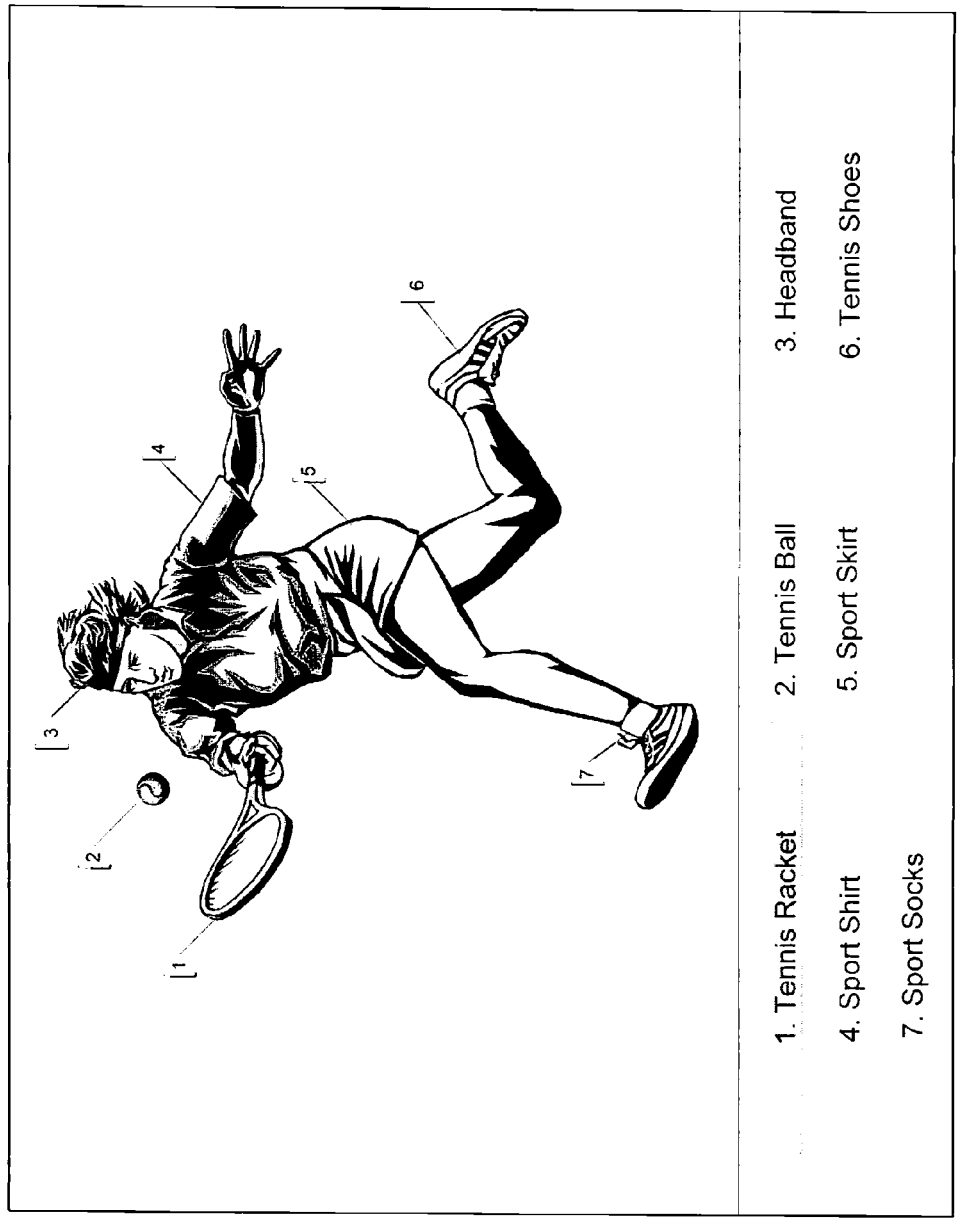
Figure 3C:
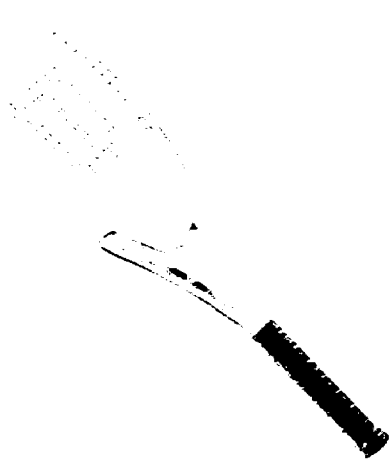

As set forth in FIG. 2, when a viewer is watching a show 200 (e.g., a tennis game as shown in FIG. 3A), he (or she) may find some items of interest on the show 201 (e.g., the tennis racket the player is using, or the headband, or the tennis shoes, or the sport skirt, or the sport skirt, or the sport socks, that the player is wearing, as shown in FIG. 3A). The interesting items could be nearly anything appearing on the show, such as clothes that cast members are wearing, or cars that they are driving, or furniture used in the scene. Then the viewer will think about whether to look for the details about this item 202. If the viewer does not want to pursue further information on the item, he/she may continue to watch the show 203. If he chooses to pursue the item, by using an interface, a list of items on the show could be displayed at the bottom of the screen 204 (as shown in FIG. 3B). The viewer scrolls over the list and chooses the item of interest (e.g., choosing the tennis racket as shown in FIG. 3B). The details of the item are then presented on the screen including its manufacturer, materials, functions, price, etc (as shown in FIG. 3C-3D). According to one approach, the show could be paused during the presentation 205. According to another approach, the details could be presented on a new opened window on the screen while the show is on 206. The product details could be introduced either in a static way such as description and/or pictures, or in a dynamic way such as by a video clip. After browsing the introduction of the product, the viewer will decide whether to buy or not 207. If the viewer does not plan to buy, he will choose to exit the introduction and return to the show 208. If he decides to buy the product, he will follow the instructions to finish the purchase by means of the interface 209. While finalizing the purchase, the viewer could choose to receive the purchased item by mail or pick up from an associated local store 210; he/she may also print a coupon resulting from this purchase, which could be reimbursed in the next instance of an in-show product purchase or in the shopping from the associated local stores 211.

If a viewer wants to see the item of interest in person before he/she decides to buy it, he/she can print out a coupon that could have a barcode attached or send an image of that item to him/her via an electronic message. The viewer then goes to a local associated store and locates the advertised item of interest with the help of the coupon or the image.

One advantage of this in-show product advertisement and purchase system is that the in-show products are updateable so that their manufactures could change the products from time to time by considering factors such as (but not limited to) time, seasonal change, and/or holiday, and/or new models, and/or new material, and/or new products, and/or new tastes.

It should be understood that the in-show product advertisement and purchase is not limited to cable TV, or satellite TV, or UHF/VHF TV as a program-receiving mode. It can be realized via other media such as PC, laptop, ipod, cell phone, palm pilot, and internet games.

In one embodiment, a viewer can download his/her favorite TV shows or movies from the internet, and the download server can either create a custom show or send a special version targeted for the viewer. When the viewer requests to download a TV show from the internet, the download server may already know something about him/her from a pre-registration or previous downloads. This can help the download server send a special version of the show to the viewer with in-show products advertisement tailored to that viewer. As an illustration, Sara is an avid tennis fan and also a heavy cell phone user. When downloading the latest tennis championship, the tennis player would not only have the image of FIG. 3A, but also a special logo of a cell phone sponsor on the tennis player's clothing.

In another embodiment, the in-show product advertisement and purchase can be used in interne games. As an illustration, in an auto racing game, the players' cars could have different sponsors logos, and the racetrack could have different billboards with soft drink advertisements with pictures of famous racecar drivers. The billboards can be changed depending on the sponsors at the time, and/or the type of players, and/or what the game server knows about the players. For a game played by teenagers, the in-show product advertisement could be new energy drink, or a new hand's music, or a type of car focused on the new entry market. For a game targeted for 30 to 40 year old players, the sponsors might be beer or cars.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

The invention claimed is:

1. A method of in-program product advertisement and purchase, comprising:
   receiving, at an electronic device, a video program from a first provider, the video program is other than a shopping program and the video program includes a plurality of items that are available for purchase;
   receiving, at the electronic device, from a second provider and separately from the video program, an electronic file comprising in-show product advertisement information associated with the plurality of items that are available for purchase;
   storing, at the electronic device, the electronic file;
   displaying the video program including the plurality of items that are available for purchase on a display;
   receiving, via an electronic interface, a request to identify items that are available for purchase in at least one scene in the video program;
   using at least one computer processor, retrieving, based on a profile of the viewer and from the electronic file, a list of items that are available for purchase in the at least one scene in the video program from the electronic file;
   displaying the list of the items on the display;
   receiving a request for additional information about a desired item, the desired item selected from the list of items;
   retrieving, over a network and in real-time, additional information about the desired item, the additional information including pricing and purchase information;
   providing the retrieved additional information for the desired item;
   receiving, via the electronic interface, a request to purchase the desired item; and
   completing the purchase of the desired item.

2. The method of claim 1, wherein the step of providing the requested information comprises:
   opening a new window on the display;
   providing a video clip about the desired item in the new window.

3. The method of claim 1, wherein the step of providing the requested information comprises:
   opening a new window on the display;
   providing an image of the desired item in the new window.

4. The method of claim 1, wherein the plurality of items that are available for purchase change based on a sponsor.

5. The method of claim 1, wherein the plurality of items that are available for purchase change based on a season.

6. The method of claim 1, wherein the video program is a video game.

7. The method of claim 1, wherein the video program is downloaded from the Internet.

8. A method of in-program product advertisement and purchase, comprising:
   receiving, at an electronic device, a video program from a first provider, the video program is other than a shopping program and the video program includes a plurality of items that are available for purchase;
   displaying the video program on a display;
   receiving, via an electronic interface, a request to identify items that are available for purchase in at least one scene in the video program;
   over a network and in real-time, receiving an electronic file comprising in-show product advertisement information associated with the video program from a second provider;
   using at least one computer processor, retrieving, based on a profile of the viewer and from the electronic file, a list of items that are available for purchase in the at least one scene in the video program from the electronic file;
   displaying the list of the items on the display;
   receiving a request for additional information about a desired item, the desired item selected from the list of items;
   retrieving, over a network and in real-time, additional information about the desired item, the additional information including pricing and purchase information;
   based on the in-show product advertisement and purchase information, providing the requested retrieved additional information for the desired item on the display;
   receiving, via the electronic interface, a request to purchase the desired item; and
   completing the purchase of the desired item.

9. The method of claim 8, wherein the step of providing the requested information comprises:
   opening a new window on the display;
   providing a video clip about the desired item in the new window.

10. The method of claim 8, wherein the step of providing the requested information comprises:
    opening a new window on the display;
    providing an image of the desired item in the new window.

11. The method of claim 8, wherein the step of completing the purchase of the desired item comprises:
    identifying a local store in which a customer can view the desired item.

12. The method of claim 8, wherein the step of completing the purchase of the desired item comprises:
    providing a coupon to be used for a subsequent purchase.

13. The method of claim 8, wherein the plurality of items that are available for purchase change based on a sponsor.

14. The method of claim 8, wherein the plurality of items that are available for purchase change based on a season.

15. The method of claim 8, wherein the video program is a video game.

16. The method of claim 8, wherein the video program is downloaded from the Internet.

17. The method of claim 1, wherein the second provider is a goods or services provider.

18. The method of claim 1, wherein the step of completing the purchase of the desired item comprises making the desired item available for pickup at a merchant.

19. The method of claim 1, wherein the first provider is a video production company.

20. The method of claim 1, wherein the first provider and the second provider are different.

21. The method of claim 1, wherein the electronic device comprises the display.

22. The method of claim 1, wherein the electronic device is a set top box.

23. The method of claim 1, wherein the profile of the user is based on at least one of a user registration and a previous purchase.

24. The method of claim 8, wherein the electronic device comprises the display.

25. The method of claim 8, wherein the electronic device is a set top box.

26. The method of claim 8, wherein the profile of the user is based on at least one of a user registration and a previous purchase.

\* \* \* \* \*